April 17, 1951  E. D. LILJA  2,549,214

ELECTROMAGNETIC FRICTION CLUTCH

Filed Aug. 31, 1945

INVENTOR
Edgar D. Lilja
BY
Carlson, Pitzner, Hubbard & Wolfe
ATTORNEYS

Patented Apr. 17, 1951

2,549,214

UNITED STATES PATENT OFFICE 2,549,214

ELECTROMAGNETIC FRICTION CLUTCH

Edgar D. Lilja, Rockford, Ill., assignor to Barber-Colman Company, Rockford, Ill., a corporation of Illinois Original application January 13, 1943, Serial No. 472,265. Divided and this application August 31, 1945, Serial No. 613,718

8 Claims. (Cl. 192—84)

This invention relates to clutches in which driving and driven elements are brought into frictional gripping engagement by energization of an electromagnet and more particularly to those in which the magnet coil and part of the magnetic flux circuit are stationarily mounted.

One object is to provide a clutch of the above character which permits the use of a driven element of extremely low moment of inertia.

A more detailed object is to provide a clutch of the above character in which the driven element is a thin disk adapted to be gripped between two driving elements when the clutch magnet is energized.

The invention also resides in the novel arrangement of the parts which permits the reluctance of the non-ferrous parts of the magnetic flux circuit to be maintained uniform at all times.

Figure 1:
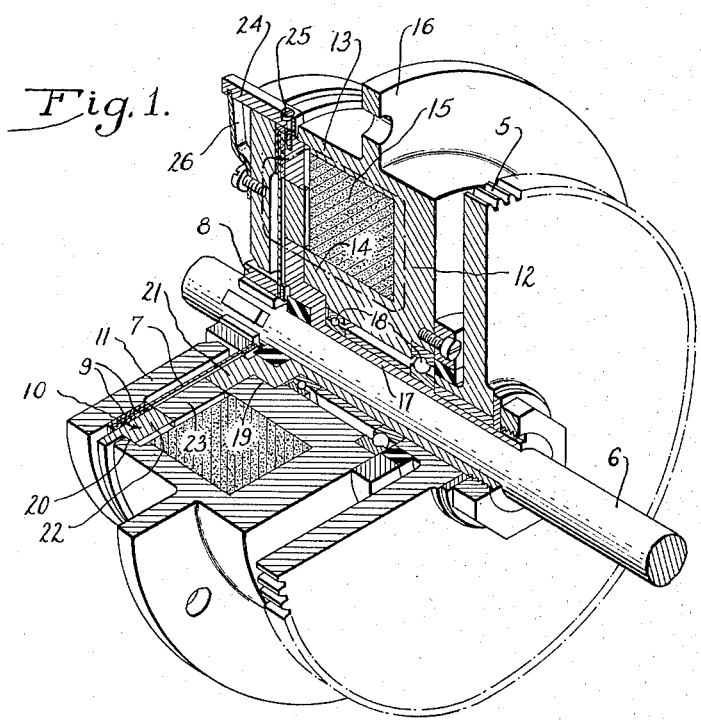

Other objects and advantages of the invention will become apparent from the following detailed description taken in connection with the accompanying drawings, in which Figure 1 is a perspective view of the improved clutch broken away to show the parts in radial section.

Figure 2:
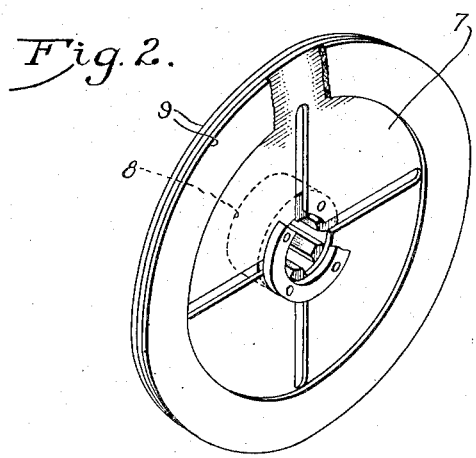

Fig. 2 is a perspective view of the driven clutch disk.

The invention is shown in the drawings embodied in a clutch for transmitting rotary motion from a driving gear 5 to a driven shaft 6 on which the gear is rotatably supported. The driven clutch element is of low moment of inertia and comprises a thin disk 7 of metal such as stainless steel having a hub 8 splined on the shaft 6 and, if desired, covered with thin rings 9 of friction material such as cork.

In accordance with the present invention, the driven clutch disk is adapted to be gripped between two plates 10 and 11 upon energization of a stationarily mounted magnet ring 12 concentric with the shaft 6. The magnet ring is of U-shaped cross section and provides two concentric pole pieces 13 and 14 between which is disposed a coil 15. A flange 16 projecting from the outer pole piece may be mounted on any suitable stationary support (not shown).

The magnetic plate 10 is in the form of a flange integral with and projecting outwardly from a sleeve 17 to which the drive gear 5 is fixed and in which the shaft 6 rotates. The sleeve is journaled in bearings 18 supported by the magnet ring 12 and holding the plate 10 in fixed axial position. The sleeve 17 has a free running fit at 19 with the inner pole piece 14 of the magnet ring, and the outer portion of the plate 10 has a similar fit 20 with the outer pole piece 13. The plate 10 is composed of inner and outer magnetic parts 21 and 22 separated by a non-magnetic central portion 23 and constituting extensions of the magnet pole pieces 13 and 14.

Thus, the magnetic parts 21 and 22 and the pole pieces 13 and 14 cooperate to form annular pole members. The plate 11 has a running fit with the hub 8 of the driven disk 7 and is slidably connected with the plate 10 through keys 24 extending across the outer periphery of the disk 7 and connected by screws 25 to the ring 22. Leaf springs 26 anchored on the plate 11 are connected to the keys and urge the plate axially toward the plate 10 so as to maintain the driven disk in light mechanical contact with both of the plates 10 and 11.

The magnetic plate 11 thus completes the magnetic flux circuit indicated in the dotted outline (Fig. 1) and extending from the outer pole piece 13 through the ring 22, the armature plate 11, and the inner ring 21 to the inner pole piece 14. It will be observed that, since the plates are urged together axially, the reluctance of the flux circuit remains constant at all times so that the degree of gripping engagement of the driven disk is always proportional to the degree of energization of the coil 15. When such energization takes place, the plates 10 and 11 are attracted toward each other, and the driven disk is thereby gripped frictionally between them so that the clutch transmits a torque corresponding to the energization of the coil 15.

This application is a division of my copending application Serial No. 472,265, filed January 13, 1943, now Patent No. 2,386,402.

I claim as my invention:

1. An electromagnetic friction clutch comprising a stationarily mounted magnet ring having concentric annular pole pieces and a coil disposed therebetween, said pole pieces providing axial facing ends, a plate rotatable about the axis of said annular pole pieces and having inner and outer magnetic portions lying adjacent the respective pole ends and magnetically separated radially from each other, a second plate of magnetic material rotatable with said first plate and yieldably urged axially toward the latter, a shaft rotatable about said axis, and a relatively thin disk fast on said shaft and disposed between said plates, said magnet, said second plate, and the inner and outer portions of said first plate forming a magnetic flux circuit of uniform reluctance around said coil and through said disk.

2. An electromagnetic friction clutch comprising a stationarily mounted magnet ring having concentric pole pieces and a coil disposed therebetween, said poles providing axially projecting ends, two rotatably mounted magnetic disks disposed opposite said pole ends and completing a magnetic circuit from one pole end to the other, said disks being shiftable axially relative to each other, a thin rotatable disk disposed between said first disks and frictionally gripped therebetween when said magnet coil is energized, and means urging said first disks together to maintain substantially the same reluctance of said flux circuit when the magnet coil is deenergized as when it is energized.

3. An electromagnetic friction clutch comprising a stationarily mounted magnet ring having concentric pole pieces and a coil disposed therebetween, said poles providing axially projecting ends, two rotatably mounted magnetic disks disposed opposite said pole ends and completing a magnetic circuit from one pole end to the other, said disks being shiftable axially relative to each other, and a thin rotatable disk disposed between said first disks and frictionally gripped therebetween when said magnet coil is energized.

4. An electromagnetic clutch having, in combination, a stationarily mounted magnet ring having concentric annular pole pieces and a coil therebetween, a driven disk rotatably mounted between the ends of said pole pieces to turn about the axis of said pole pieces, a magnetic member disposed between said disk and said pole pieces, a second magnetic member disposed on the opposite side of said disk, said members forming a magnetic flux circuit extending from one pole piece to the other through said disk, means rotatably supporting said first member in fixed relation to said pole pieces, and means extending across the outer periphery of said disk and supporting said second member for axial movement toward and away from said first member.

5. An electromagnetic friction clutch comprising a stationarily mounted magnet ring having concentric pole pieces with a common axis and a coil disposed therebetween, a plate rotatable about said axis and having inner and outer magnetic portions lying adjacent the respective pole pieces and magnetically separated radially from each other, a second plate of magnetic material rotatable with said first plate and yieldably urged axially toward the latter, a shaft rotatable about said axis, and a relatively thin disk disposed between said plates, said magnet ring, said second plate, and the inner and outer portions of said first plate forming a magnetic flux circuit of uniform reluctance extending around said coil and through said disk.

6. An electromagnetic friction clutch comprising an annular magnet having annular pole members concentric with the axis of the magnet and a coil, said pole members providing flat axially projecting ends magnetically separated radially from each other, a plate of magnetic material rotatable about said axis and radially spanning said pole ends, spring means yieldably urging said plate axially toward said pole members, a shaft rotatable about said axis, and a relatively thin disk of nonmagnetic material disposed between said plate and said pole ends, said plate cooperating with said magnet to form a magnetic flux circuit extending back and forth through said disk whereby to cause the latter to be gripped between said plate and said pole ends when said coil is energized.

7. An electromagnetic friction clutch comprising an annular magnet coil, a stationarily mounted magnetic ring partially surrounding each cross section of said coil, a radially disposed friction plate composed at least in part of magnetic material and disposed at one end of said coil, means rotatably supporting said plate to turn about the coil axis, a second radially disposed friction plate supported adjacent said first plate for rotation about said axis, and a magnetic plate disposed on the other side of said friction plate and cooperating with said magnetic ring and said first plate to form a magnetic flux path extending axially across said second plate and acting when said coil is energized to draw said three plates into gripping engagement.

8. An electromagnetic clutch having, in combination, a stationarily mounted magnet ring having concentric annular pole pieces and a coil therebetween, a driven disk rotatably mounted adjacent the ends of said pole pieces to turn about the axis of said pole pieces, a magnetic member disposed between said disk and said pole pieces, a second magnetic member disposed on the opposite side of said disk, said members forming a magnetic flux circuit extending from one pole piece to the other through said disk, means rotatably supporting said first member in axially fixed relation to said pole pieces, a plurality of angularly spaced parallel bars each rigid at one end with said first member and projecting across the outer periphery of said disk, and radial arms projecting inwardly from the projecting ends of said bars and supporting said second magnetic member for axial floating movement toward and away from said first member.

EDGAR D. LILJA.

REFERENCES CITED

The following references are of record in the file of this patent:

UNITED STATES PATENTS

| Number | Name | Date |
|---|---|---|
| 736,789 | Schuster | Aug. 18, 1903 |
| 1,342,270 | Walker | June 1, 1920 |
| 1,823,334 | Payne | Sept. 15, 1931 |

FOREIGN PATENTS

| Number | Country | Date |
|---|---|---|
| 204,512 | Great Britain | Oct. 4, 1923 |